(12) United States Patent
Yang (10) Patent No.: US 7,379,602 B2
(45) Date of Patent: May 27, 2008

(54) EXTENDED ISOMAP USING FISHER LINEAR DISCRIMINANT AND KERNEL FISHER LINEAR DISCRIMINANT

(75) Inventor: Ming-Hsuan Yang, Sunnyvale, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 890 days.

(21) Appl. No.: 10/621,872

(22) Filed: Jul. 16, 2003

(65) Prior Publication Data

US 2004/0017947 A1 Jan. 29, 2004

Related U.S. Application Data

(60) Provisional application No. 60/399,507, filed on Jul. 29, 2002.

(51) Int. Cl.
*G06K 9/62* (2006.01)
*G06K 9/46* (2006.01)
*G06K 9/00* (2006.01)
*G09G 5/00* (2006.01)
*H04B 1/66* (2006.01)

(52) U.S. Cl. .................. 382/225; 382/115; 382/190; 345/644; 375/240.16

(58) Field of Classification Search ............... 382/224, 382/115, 190, 225; 345/644; 375/240.16
See application file for complete search history.

(56) References Cited

U.S. PATENT DOCUMENTS

| | | |
|---|---|---|
| 5,164,992 A | 11/1992 | Turk et al. |
| 5,710,833 A | 1/1998 | Moghaddam et al. |
| RE36,041 E | 1/1999 | Turk et al. |
| 6,112,195 A | 8/2000 | Burges |
| 7,010,167 B1 * | 3/2006 | Ordowski et al. .......... 382/225 |

FOREIGN PATENT DOCUMENTS

WO     WO 03/049033 A1     6/2003

OTHER PUBLICATIONS

Saul et al, Think Globally Fit Locally: Unsupervised Learning of Nonlinear Manifolds, 2006, University of Pennsylvania, all pages.*
Adini, Yael et al., "*Face Recognition: The Problem of Compensating for Changes in Illumination Direction*," IEEE Transactions on Pattern Analysis and Machine Intelligence (Jul. 1997), vol. 19, No. 7, pp. 721-732.
Bartlett, Martin Stewart, "*Face Image Analysis by Unsupervised Learning and Redundancy Reduction*," Doctorial Dissertation at University of California at San Diego (1998).

(Continued)

*Primary Examiner*—Bhavesh M. Mehta
*Assistant Examiner*—Kathleen Yuan
(74) *Attorney, Agent, or Firm*—Fenwick & West LLP; Mark Duell (57) ABSTRACT

A method for representing images for pattern classification extends the conventional Isomap method with Fisher Linear Discriminant (FLD) or Kernel Fisher Linear Discriminant (KFLD) for classification. The extended Isomap method estimates the geodesic distance of data points corresponding to images for pattern classification, and uses pairwise geodesic distances as feature vectors. The method applies FLD to the feature vectors to find an optimal projection direction to maximize the distances between cluster centers of the feature vectors. The method may apply KFLD to the feature vectors instead of FLD.

45 Claims, 9 Drawing Sheets

OTHER PUBLICATIONS

Bartlett, Marian Stewart, "*Independent Component Representations for Face Recognition*," Proceedings of the SPIE Symposium on Electronic Imaging: Science and Technology; Conference on Human Vision and Electronic Imaging III, San Jose, CA (Jan. 1998), pp. 528-539.

Bartlett, Marian Stewart et al., "*Viewpoint Invariant Face Recognition Using Independent Component Analysis and Attractor Networks*," Advances in Neural Information Processing Systems (1997), vol. 9 pp. 817-823.

Baudat, G. et al, "*Generalized Discriminant Analysis Using a Kernel Approach*," Neural Computation (2000), vol. 12, pp. 2385-2404.

Belhumeur, Peter N. et al., "*Eigenfaces vs. Fisherfaces: Recognition Using Class Specific Linear Projection*," IEEE Transactions on Pattern Analysis and Machine Intelligence (Jul. 1997), vol. 19, No. 7, pp. 711-720.

Bell, Anthony J. et al., "*An Information-Maximisation Approach to Blind Separation and Blind Deconvolution*," Neural Computation (1995), vol. 7, No. 6, pp. 1004-1034.

Bishop, Christopher M. et al., "*Non-linear Bayesian Image Modelling*," Proceedings of the Sixth European Conference on Computer Vision (2000), vol. 1, pp. 3-17.

Frey, Brendan J. et al., "*Mixtures of Local Linear Subspaces for Face Recognition*," Proceedings of the IEEE Conference on Computer Vision and Pattern Recognition (Jun. 1998), pp. 32-37.

Hyvärinen, Aapo et al., "*A Fast Fixed-Point Algorithm for Independent Component Analysis*," Neural Computation (1997), vol. 9, No. 7, pp. 1483-1492.

Li, Yongmin et al., "*Dynamic Face Recognition Using Identity Surfaces*" [online], [retrieved on Mar. 11, 2001]. Retrieved from the Internet: <URL: http://www.dai.ed.ac.uk/CVonline/Local_Copies/LI1/idsurf>.

Li, Yongmin et al., "*Extracting Discriminant Features of Faces Using Kernel Discriminant Analysis*," [online], [retrieved on Mar. 11, 2002]. Retrieved from the Internet: <URL: http://www.dcs.qmul.ac.uk/~yongmin/kda/index.html>.

Liu, Chengjin et al., "*Evolutionary Pursuit and Its Application to Face Recognition*," IEEE Transactions of Pattern Analysis and Machine Intelligence (Jun. 2000), vol. 22, No. 6, pp. 570-582.

Martinez, Aleix M. et al., "*PCA versus LDA*," IEEE Transactions on Pattern Analysis and Machine Intelligence (Feb. 2001), vol. 23, No. 2, pp. 228-233.

Mika, Sebastian et al., "*A Mathematical Programming Approach to the Kernel Fisher Algorithm*," Advances in Neural Information Processing Systems (2001), vol. 13, pp. 591-597.

Mika, Sebastian et al., "*Fisher Discriminant Analysis With Kernels*," Proceedings of IEEE Neural Networks for Signal Processing IX (Jun. 1999), pp. 41-48.

Mika, Sebastian et al., "*Invariant Feature Extraction and Classification in Kernel Spaces*," Advances in Neural Information Processing Systems (2000), vol. 12, pp. 526-532.

Moghaddam, Baback, "*Principal Manifolds and Bayesian Subspaces for Visual Recognition*," Proceedings of the Seventh IEEE International Conference on Computer Vision (1999), pp. 1131-1136.

Moghaddam, Baback, "*Probabilistic Visual Learning for Object Representation*," IEEE Transactions on Pattern Analysis and Machine Intelligence (Jul. 1997), vol. 19, No. 7, pp. 696-710.

Phillips, P. Jonathan, "*Support Vector Machines Applied to Face Recognition*," Advances in Neural Information Processing Systems (1998), vol. 11, pp. 803-809.

Phillips, P. Jonathan, "*The FERET Evaluation Methodology for Face-Recognition Algorithms*," IEEE Transactions on Pattern Analysis and Machine Intelligence (Oct. 2000), vol. 22, No. 10, pp. 1090-1104.

Platt, John C. et al., "*Large Margin DAGs for Multiclass Classification*," Advances in Neural Information Processing Systems (2000), vol. 12, pp. 547-553.

Roth, Volker et al., "*Nonlinear Discriminant Analysis Using Kernel Functions*," Advances in Neural Information Processing Systems (2000), vol. 12, pp. 568-574.

Roweis, Sam T. et al., "*Nonlinear Dimensionality Reduction by Locally Linear Embedding*," Science (Dec. 22, 2000), vol. 290, No. 5500, pp. 2323-2326.

Schölkopf, Bernhard et al., "*Input Space Versus Feature Space in Kernel-Based Methods*," IEEE Transactions on Neural Networks (Sep. 1999), vol. 10, No. 5, pp. 1000-1017.

Schölkopf, Bernhard et al., "*Kernel Principal Component Analysis*," Advances in Kernel Methods—Support Vector Learning, MIT Press (1999), pp. 327-352.

Schölkopf, Bernhard et al., "*Nonlinear Component Analysis As A Kernel Eigenvalue Problem*," Neural Computation (1998), vol. 10, pp. 1299-1319.

Swets, Daniel L. et al., "*Hierarchical Disciminant Analysis for Image Retrieval*," IEEE Transactions on Pattern Analysis and Machine Intelligence (May 1999), vol. 21, No. 5, pp. 386-401.

Teh, Yee Whye et al., "*Rate-coded Restricted Boltzmann Machines for Face Recognition*," Advances in Neural Information Processing Systems (2001), vol. 13, pp. 908-914.

Tenenbaum, Joshua B. et al., "*A Global Geometric Framework for Nonlinear Dimensionality Reduction*," Science (Dec. 22, 2000), vol. 290, No. 5500, pp. 2319-2323.

Weston, J. et al., "*Feature Selection for SVMs*," Proceedings of the Advances in Neural Information Processing Systems (2001), vol. 13, pp. 668-674.

Yang, Ming-Hsuan et al., "*Face Recognition Using Kernel Eigenfaces*," Proceedings of the IEEE International Conference on Image Processing (Sep. 2000), Vancouver, Canada, vol. 1, pp. 37-40.

Zhao, W. et al., "*Discriminant Analysis of Principal Components for Face Recognition*," Third International Conference on Automatic Face and Gesture Recognition (1998), pp. 336-341.

International Search Report dated Mar. 4, 2003 for International Application No. PCT/JP02/12649, filed on Dec. 3, 2002.

International Search Report dated Aug. 26, 2003 for International Application No. PCT/JP03/09534 filed on Jul. 28, 2003.

Written Opinion from International Preliminary Examining Authority dated Aug. 26, 2003 for International Application No. PCT/JP02/12649 filed on Dec. 3, 2002.

\* cited by examiner

EXTENDED ISOMAP USING FISHER LINEAR DISCRIMINANT AND KERNEL FISHER LINEAR DISCRIMINANT

CROSS-REFERENCE TO RELATED APPLICATIONS

This application claims priority under 35 U.S.C. §119(e) to U.S. Provisional Patent Application No. 60/399,507 entitled "Extended Isomap for Pattern Classification," filed on Jul. 29, 2002, the subject matter of which is incorporated by reference herein in its entirety. This application is also related to co-pending U.S. patent application Ser. No. 10/201,429 entitled "Face Recognition Using Kernel Fisherfaces," filed on Jul. 22, 2002.

TECHNICAL FIELD

The present invention relates generally to pattern classification and, more specifically, to representing images for pattern classification by extended Isomap using Linear Discriminant or Kernel Fisher Linear Discriminant.

BACKGROUND OF THE INVENTION

Pattern classification (also know as pattern recognition) has received increased attention lately, since it can be used in various applications. For example, face recognition technology, which involves classification of face images, can be used in applications such as surveillance, security, advertising, and the like.

Pattern classification involves classifying data points in an input space where the data points correspond to the images or patterns to be classified. The data points typically lie on a complex manifold in the input space, and pattern classification is carried out by determining how close the data points are to reference data points corresponding to reference images. For example, in face recognition, a face image is typically a two-dimensional N by N array of intensity values and each face image can be represented in the input space as a vector having a dimension $N^2$ in the input space having a dimension $N^2$. A set of face images corresponds to a set of data points (vectors) in the $N^2$ dimensional input space, and the data points typically constitute a complex manifold in the $N^2$ dimensional input space. Face recognition involves determining how close the data points corresponding to the face images are to data points corresponding to reference face images.

In order to determine how close the data points are to each other and to the reference data points in the input space for pattern classification, the nature of the manifold should be taken into consideration. That is, the geodesic distance (distance metrics along the surface of the manifold) between data points in the input space should be used to determine how close the data points are, because the geodesic distance reflects the intrinsic geometry of the underlying manifold.

Figure 1A:
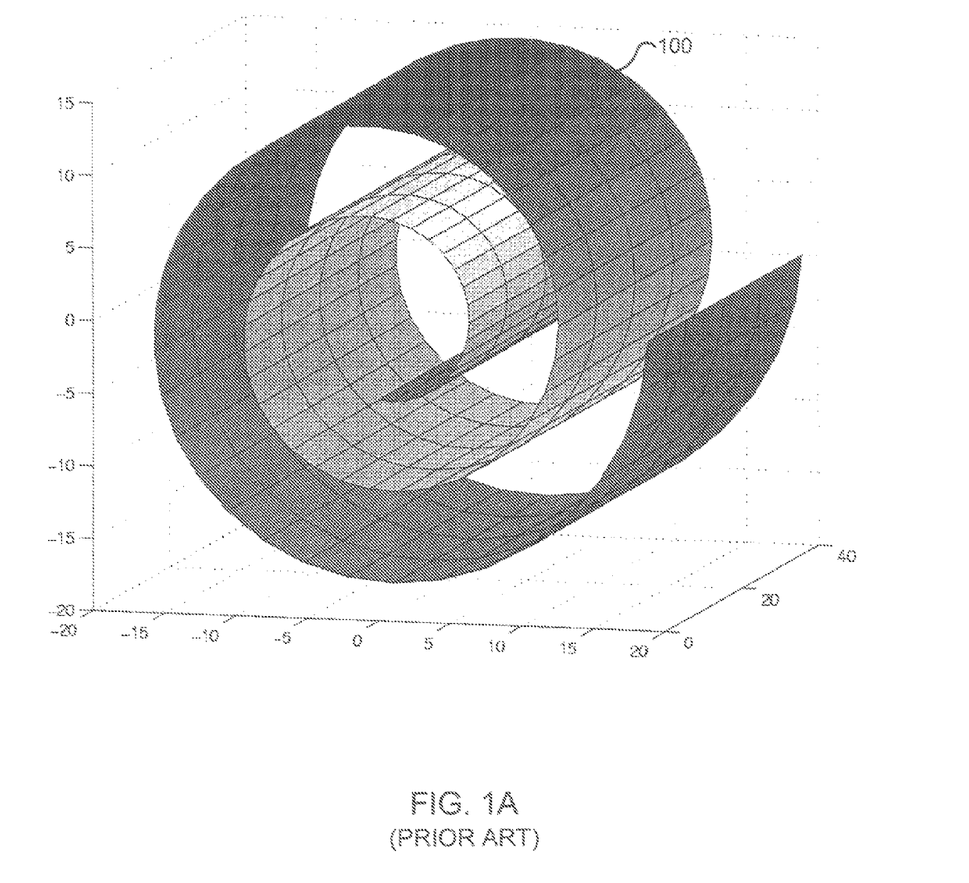
FIG. 1A is a diagram illustrating an example of a complex manifold on which data points of different classes are displayed in distinct shaded patches.
Figure 1B:
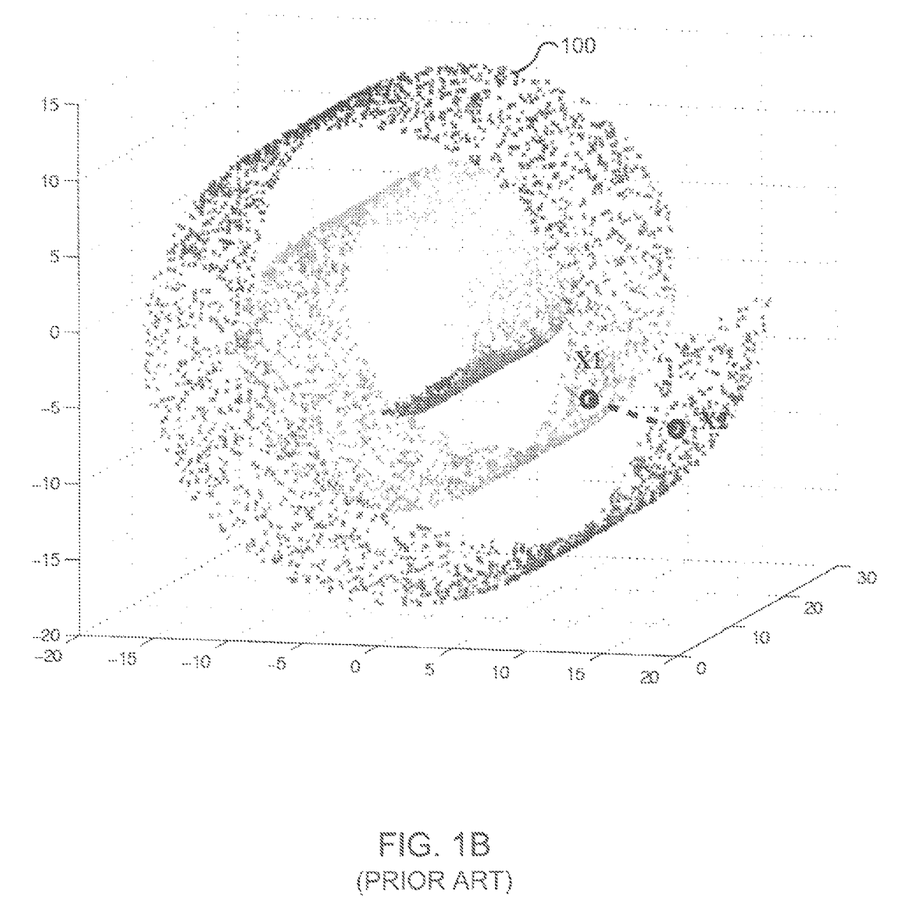
FIG. 1B is a diagram illustrating data points sampled from the different classes shown in the manifold of FIG. 1A.

FIG. 1A is a diagram illustrating an example of a complex manifold 100 on which data points of different classes are displayed in distinct shaded patches, and FIG. 1B is a diagram illustrating data points sampled from these different classes shown in the manifold 100 of FIG. 1A For a pair of points on the manifold 100 in FIG. 1A, their Euclidean distance may not accurately reflect their intrinsic similarity and consequently is not suitable for use in pattern classification. For example, referring to FIG. 1B, the Euclidean distance between two data points (e.g., $x_1$ and $x_2$) may be deceptively small in the three-dimensional input space, although the geodesic distance between the two data points ($x_1$ and $x_2$) on the intrinsic two-dimensional manifold 100 is large. Therefore, the geodesic distance should be used to determine how close the data points ($x_1$ and $x_2$) are on the manifold, since the geodesic distance reflects the intrinsic geometry of the underlying manifold 100.

Recently, the Isomap method (also known as "isometric feature mapping") and the Locally Linear Embedding (LLE) method have been proposed for learning the intrinsic geometry of complex manifolds using local geometric metrics within a single global coordinate system. The conventional Isomap method first constructs a neighborhood graph that connects each data point on the manifold to all its k-nearest neighbors or to all the data points within some fixed radius $\epsilon$ in the input space. For neighboring points, the input space Euclidean distance usually provides a good approximation of their geodesic distance. For each pair of data points, the shortest path connecting them in the neighborhood graph is computed and is used as an estimate of the true geodesic distance. These estimates are good approximations of the true geodesic distances if there are a sufficient number of data points on the manifold in the input space like FIG. 1B. A conventional multi-dimensional scaling method is then applied to construct a low dimensional subspace that best preserves the manifold's estimated intrinsic geometry.

The Locally Linear Embedding (LLE) method captures local geometric properties of the complex embedding manifolds by a set of linear coefficients in the high dimensional input space that best approximates each data point from its neighbors in the input space. LLE then finds a set of low dimensional points where each point can be linearly approximated by its neighbors with the same set of coefficients that was computed from the high dimensional data points in the input space while minimizing reconstruction cost.

Although the conventional Isomap method and the LLE method have demonstrated acceptable results in finding the embedding manifolds that best describe the data points with minimum reconstruction error as compared to, they fail to represent the images in an optimum way as to facilitate classification of those images. Furthermore, the conventional Isomap method and the LLE method assume that the embedding manifold is well sampled, which may not be the case in some classification problems such as face recognition since there are typically only a few samples available for each person.

Therefore, there is a need for a method of optimally representing patterns such that the classification of such patterns are facilitated and the intrinsic geometry of the underlying manifold of the data points corresponding to the patterns are preserved.

SUMMARY OF INVENTION

The present invention provides a method for representing images for pattern classification by extending the conventional Isomap method with Fisher Linear Discriminant (FLD) or Kernel Fisher Linear Discriminant (KFLD) for classification. The method of the present invention estimates the geodesic distance of data points corresponding to images for pattern classification, similar to conventional Isomap methods, and then uses pairwise geodesic distances as feature vectors. According to one embodiment of the present invention, the method applies FLD to the feature vectors to find an optimal projection direction to maximize the distances between cluster centers of the feature vectors.

In another embodiment of the present invention, the method applies KFLD to the feature vectors rather than FLD to find an optimal projection direction to maximize the distances between cluster centers of the feature vectors.

The present invention also provides a system for representing images for pattern classification by extending the conventional Isomap method with Fisher Linear Discriminant (FLD) or Kernel Fisher Linear Discriminant (KFLD) for classification. The system of the present invention includes a neighboring graph generation module for generating a neighboring graph for data points corresponding to the images, a geodesic distance estimation module for estimating the geodesic distance of data points, and a FLD projection module for generating feature vectors based on the pairwise geodesic distances and applying FLD to the feature vectors to find an optimal projection direction to maximize the distances between cluster centers of the feature vectors, according to one embodiment of the present invention.

In another embodiment of the present invention, the system includes a KFLD module rather than a FLD module for generating feature vectors based upon the pairwise geodesic distances and applying FLD to the feature vectors to find an optimal projection direction to maximize the distances between cluster centers of the feature vectors, according to another embodiment of the present invention.

The present invention may be embodied in various forms, including computer products, methods, and systems, special or general purpose computing devices or apparatuses, online services or systems, users interfaces, etc.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

DETAILED DESCRIPTION OF EMBODIMENTS

Figure 2:
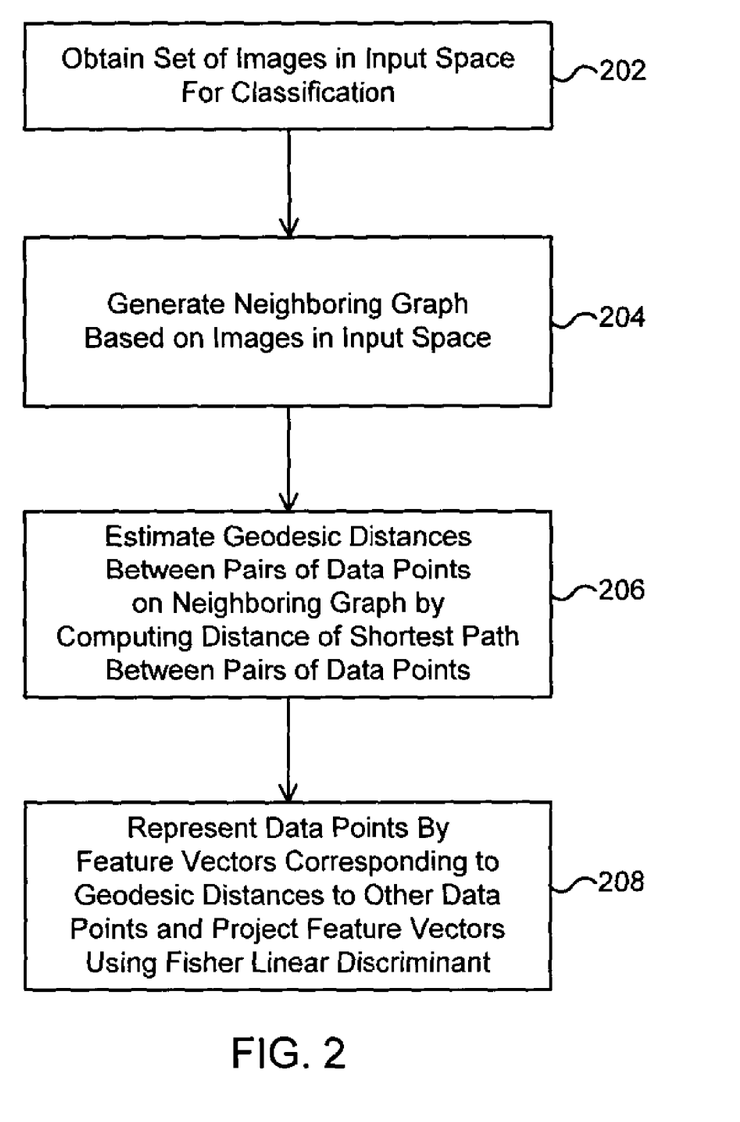
FIG. 2 is a flowchart illustrating a method of representing images for pattern classification by extended Isomap according to a first embodiment of the present invention.

FIG. 2 is a flowchart illustrating a method of representing images for pattern classification by extended Isomap according to a first embodiment of the present invention. The extended Isomap method of FIG. 2 employs Fisher Linear Discriminant (FLD) combined with the conventional Isomap method to represent images for pattern classification.

Referring to FIG. 2, a set of sample images for classification is obtained 202 in the input space. The sample images are represented in the form of vectors. Assuming that there is a set of m sample images $\{x_1, \ldots, x_m\}$ and that each sample image belongs to one of the c classes $\{Z_1, \ldots, Z_c\}$, a neighboring graph of the sample images is generated 204. To this end, the neighbors of each sample $x_i$ are determined on a low dimensional manifold M on which the data points corresponding to the sample images lie, based on distance metrics $d_X(x_i, x_j)$ in the input space X. Such distance metrics can be the Euclidean distance that is often used in face recognition. Such distance metrics can also be the tangent distance that has been shown to be effective in hand digit recognition. The distance between two data points in the input space provides a good approximation of the geodesic distance when the data points are neighboring points. Thus, the input space distance metrics can be utilized to determine whether or not two data points are neighbors.

In one embodiment, the neighbors of each sample $x_i$ are determined by the k-Isomap method that uses a k-nearest neighbor algorithm to determine neighbors. In another embodiment, the neighbors of each sample $x_i$ are determined by the $\epsilon$-Isomap method that includes all data points within a predetermined radius $\epsilon$ as neighbors.

The neighborhood relationships between the data points corresponding to the sample images are represented in a weighted graph G in which:

$d_G(x_i,x_j)=d_X(x_i,x_j)$, if $x_i$ and $x_j$ are neighbors, and $d_G(x_i,x_j)=\infty$, if otherwise. (1)

Next, the geodesic distances $d_M(x_i, x_j)$ between any pair of data points on the manifold M are estimated 206. For a pair of data points that are far away, their geodesic distance can be approximated by a sequence of short hops between neighboring data points. In other words, the geodesic distance $d_M(x_i,x_j)$ is approximated by the shortest path between the data points $x_i$ and $x_j$ on the weighted graph G, which is computed by the Floyd-Warshall algorithm:

$d_M(x_i,x_j)=\min\{d_G(x_i, x_j), d_G(x_i,x_k)+d_G(x_k,x_j)\}, k\neq i, j.$ (2)

The shortest paths between any two data points are represented in a matrix D where $D_{ij}=d_M(x_i, x_j)$ Then, each of the data points corresponding to the sample images are represented 208 by a feature vector of its geodesic distance to any other points, and Fisher Linear Discriminant is applied 208 to the feature vectors to find an optimal projection direction for classification. Fisher Linear Discriminant determines a subspace in the low dimensional space where the class centers are separated as far as possible so that classification of the sample images are facilitated.

The feature vector corresponding to the data point $x_i$ is an m−1 dimensional vector $f_i=[D_{ij}]$ where j=1, ..., m and j≠i.

The between-class and within-class scatter matrices in Fisher Linear Discriminant are computed by:

$$S_B = \sum_{i=1}^{c} N_i(\mu_i - \mu)(\mu_i - \mu)^T \qquad (4)$$

$$S_W = \sum_{i=1}^{c} \sum_{f_k \in z_i} (f_k - \mu_i)(f_k - \mu_i)^T \qquad (5)$$

where $\mu$ is the mean of all sample feature vectors $f_k$, $\mu_i$ is the mean of class $Z_i$, $S_{wi}$ is the covariance of class $Z_i$, and $N_i$ is the number of samples in class $Z_i$. The optimal projection $W_{FLD}$ is chosen as the matrix with orthonormal columns which maximizes the ratio of the determinant of the between-class scatter matrix of the projected samples to the determinant of the within-class scatter matrix of the projected samples:

$$W_{FLD} = \arg\max_w \frac{|W^T S_B W|}{|W^T S_W W|} = [w_1, w_2, \ldots, w_m] \qquad (6)$$

where {$w_i$|i=1, 2, . . . , m} is the set of generalized eigenvectors of $S_B$ and $S_w$, corresponding to the m largest generalized eigenvalues {$\lambda_i$|i=1, 2, . . . , m}. The rank of $S_B$ is c−1 or less because it is the sum of c matrices of rank one or less. Thus, there are at most c−1 nonzero eigenvalues. Each data point $x_i$ corresponding to the sample image is represented by a low dimensional feature vector $y_i = W_{FLD} f_i$.

The computational complexity and memory requirements of the conventional Isomap method and the extended Isomap method according to the present invention are dominated by the calculation of the shortest paths between the data points. The Floyd-Warshall algorithm requires $0(m^3)$ operations and stores $0(m^2)$ elements of estimated geodesic distances for straightforward implementations. On the other hand, the Multi-Dimensional Scaling (MDS) procedure used in the conventional Isomap method can be time-consuming as a result of its iterative operations to detect meaningful underlying dimensions that explain the observed similarities or dissimilarities (distances) between data points. The neighboring graph $d_G(x_i, x_j)$ provides better estimates of the intrinsic geodesic distance $d_M(x_i, x_j)$ as the number of data points increases. In practice, however, there may not be a sufficient number of samples, and so the geodesic distances $d_G(x_i, x_j)$ may not be good approximations of the intrinsic geodesic distances. Thus, the conventional Isomap may not be able to find intrinsic dimensionality from the data points and may not be suitable for pattern classification purposes.

In contrast, the extended Isomap method utilizes the distances between the scatter centers (i.e., poor approximations are averaged out) and thus may perform well for pattern classification. While the conventional Isomap method uses MDS to find dimensions of the embedding manifolds, in the extended Isomap method of the present invention the dimensionality of the subspace is determined by the number of class (i.e., c−1), which makes the computations for pattern classification much simpler than those required by conventional Isomap.

To deal with the singularity problem of within-scatter matrix $S_w$ that is often encountered in pattern classification, a multiple of the identity matrix may be added to the within-scatter matrix, i.e., $S_w+\epsilon I$(where $\epsilon$ is a small number), according to one embodiment of the present invention. This also makes the eigenvalue problem numerically more stable.

Figure 3:
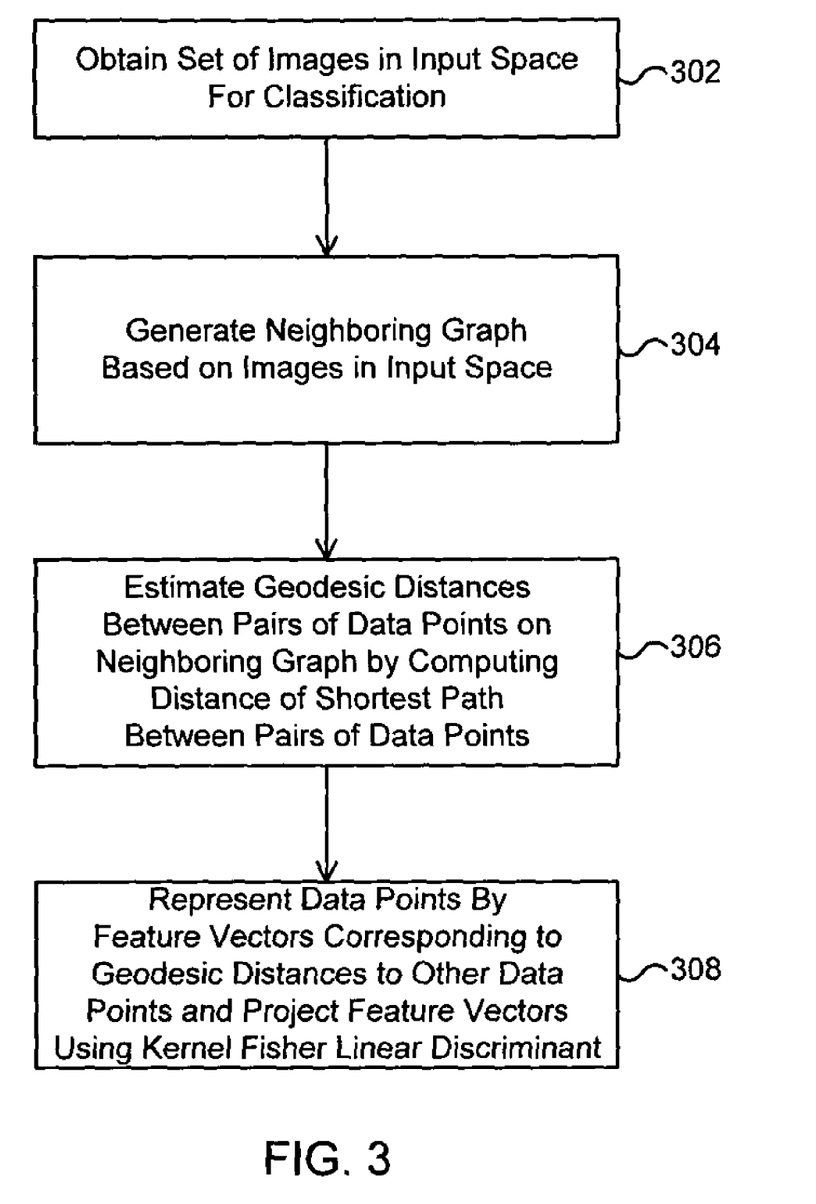
FIG. 3 is a flowchart illustrating a method of representing images for pattern classification by extended Isomap according to a second embodiment of the present invention.

FIG. 3 is a flowchart illustrating a method of representing images for pattern classification by extended Isomap according to a second embodiment of the present invention. For the data sets that are not linearly separable, the application of FLD in step 208 may be replaced by Kernel Fisher Linear Discriminant (KFLD) method 308. This is because KFLD conceptually projects data from the input space to a higher dimensional space in order to extract more representative features of the images prior to computing the optimal discriminant function to separate the data points. The method of FIG. 3 is identical to the method described in FIG. 2 except that the feature vectors are projected using KFLD in step 308 rather than FLD.

In KFLD analysis, each feature vector f(where $f_i=[D_{ij}]$ where j=1, . . . , m and j≠I) obtained from the extend Isomap method is projected from the input space, $R^n$, to $\Phi(f)$ in a high dimensional feature space $R^F$, by a nonlinear mapping function (projection function):

$$\Phi: R^n \rightarrow R^F, F > n \qquad (7)$$

Each feature vector $f_i$ will be denoted as feature vector f hereinafter for the convenience of describing the equations involved with KFLD. The dimension F of the high dimensional feature space can be arbitrarily large.

Selection of a specific projection function is dependent upon the nature of the data and application and is often empirically determined. Numerous forms of projection functions $\Phi(x)$ can be used for the present invention. However, there are only a limited number of projection functions that are compatible with efficient and systematic computation. One approach for selecting a particular projection function $\Phi(x)$ is to select a projection function of which the dot product can be computed efficiently using a kernel function rather than by actually performing the dot product operation of the projection functions, since dot product operations of the projection functions are used frequently in the computation carried out for projecting the feature vectors from the high dimensional feature space to the low dimensional face image space and computationally intense. Thus, such approach finds kernel functions k(x,y) that satisfy the following relation:

$$k(x,y) = \Phi(x) \cdot \Phi(y) \qquad (8)$$

Typically, computations using the kernel function k(x,y) can be carried out much more efficiently compared to computations using the dot product $\Phi(x) \cdot \Phi(y)$, because the computation using the kernel function k(x,y) depends on the n-dimensional input space (usually low) whereas the computation of $\Phi(x) \cdot \Phi(y)$ depends on the dimensionality of $\Phi(x)$ and $\Phi(y)$, which is usually very high and can be infinite. The polynomial kernel ($k(x,y)=(x \cdot y)^d$) and the Gaussian kernel ($k(x,y)=e^{-\|x-y\|^2/2\sigma^2}$, where $\sigma$ is the standard deviation of the Gaussian distribution from which x and y come from), are the most widely used kernel functions.

Note that the exact form of the projection functions ($\Phi(x), \Phi(y)$) is completely dictated by the selected kernel function k(x,y). In fact, the exact closed forms of the projection functions need not be known if only the dot products of the projected samples, $\Phi(x) \cdot \Phi(y)$ are used in the computation for projecting the face images from the high dimensional feature space to the lower dimensional face image space, since the kernel function k(x,y) can be used instead to perform such projection in a computationally efficient way. Thus, one advantage of using kernel functions is that an n-dimensional face image can be projected to an f-dimensional feature space (f is much larger than n), which provides a richer feature representation, without knowing the exact closed form of the projection function. When the d-degree polynomial kernel function is used, the dimensionality f of the high dimensional feature space is $$\binom{d+n-1}{d}.$$

Denoting the within-class and between-class scatter matrices in the high dimensional space $R^F$ by $$S_W^\Phi \text{ and } S_B^\Phi,$$

respectively, and applying FLD in the high-dimensional kernel space $R^F$, it is necessary to find eigenvalues $\lambda$ and eigenvectors $w^\Phi$ of the eigenvalue problem:

$$S_B^\Phi w^\Phi = \lambda S_W^\Phi w^\Phi. \qquad (9)$$

In the high dimensional feature space $R^F$, the following equations follow:

$$S_W^\Phi = \sum_{i=1}^c S_i^\Phi \qquad (10)$$

$$S_i^\Phi = \sum_{x \in X_i} (\Phi(f) - \mu_i^\Phi)(\Phi(f) - \mu_i^\Phi)^T \qquad (11)$$

$$\mu_i^\Phi = \frac{1}{n_i} \sum_{f \in X_i} \Phi(f) \qquad (12)$$

$$S_B^\Phi = \sum_{i=1}^c n_i (\mu_i^\Phi - \mu^\Phi)(\mu_i^\Phi - \mu^\Phi)^T \qquad (13)$$

where $\mu^\Phi$ is the total mean of vector $$\Phi(f), \text{ i.e., } \mu^\Phi = \frac{1}{n} \sum_x \Phi(f).$$

It follows that the optimal projection matrix $$w_{OPT}^\Phi$$

in the high dimensional space $R^F$ is:

$$w_{OPT}^\Phi = \arg\max_{w^\Phi} \frac{|(w^\Phi)^T S_B^\Phi w^\Phi|}{|(w^\Phi)^T S_W^\Phi w^\Phi|} = [w_1^\Phi, \ldots, w_m^\Phi] \qquad (14)$$

where $$\{w_i^\Phi \mid i = 1, 2, \ldots, m\}$$

is the set of generalized eigenvectors corresponding to the m largest generalized eigenvalues $\{\lambda_i | i=1,2,\ldots,m\}$. "arg max$_{w^\Phi}$" in equation (14) finds $w^\Phi$ that maximizes the ratio that follows arg max.

To avoid the singularity problem in computing $w^\Phi$, a small identity matrix I may be added to $S_W^\Phi$ in order to make it numerically stable, according to one embodiment of the present invention. In other words, $S_W^\Phi = S_W^\Phi + \epsilon I$, where I is an identity matrix whose dimensionality is the same as $S_W^\Phi$ and $\epsilon$ is a small real number, for example 0.001 according to one embodiment of the present invention. By adding a small real number to the diagonals of the within-class scatter matrix, none of the elements on the diagonal of the within-class scatter matrix can be zero, thus eliminating singularity problems.

Consider a c-class problem (i.e., each sample belongs to one of the c classes) and let the r-th sample of class t and the s-th sample of class u be $f_{tr}$ and $f_{us}$, respectively (where class t has $l_t$ samples and class u has $l_u$ samples). The kernel function can be defined as:

$$(k_{rs})_{tu} = k(f_{tr}, f_{us}) = \Phi(f_{tr}) \cdot \Phi(f_{us}) \qquad (15)$$

Let K be a m×m matrix defined by the elements $$(K_{tu})_{u=1,\ldots,c}^{t=1,\ldots,c}$$

where $K_{tu}$ is a matrix composed of dot products in the high dimensional feature space $R^F$, i.e., $$K = (K_{tu})_{u=1,\ldots,c}^{t=1,\ldots,c}, \qquad (16)$$

where $$K_{tu} = (k_{rs})_{s=1,\ldots,l_u}^{r=1,\ldots,l_t}. \qquad (17)$$

Here, $K_{tu}$ is an $l_t \times l_u$ matrix, and K is an m×m symmetric matrix. Also, matrix Z is defined:

$$Z = (Z_t)_{t=1,\ldots,c} \qquad (18)$$

where $(Z_t)$ is an $l_t \times l_t$ matrix with terms all equal to $$\frac{1}{l_t},$$

i.e., Z is an m×m block diagonal matrix.

The between-class and within-class scatter matrices in the high dimensional feature space $R^F$ in equation (13) and (10), respectively, become:

$$S_B^\Phi = \sum_{i=1}^{c} l_i \mu_i^\Phi (\mu_i^\Phi)^T \qquad (19)$$

$$S_W^\Phi = \sum_{i=1}^{c} \sum_{j=1}^{l_i} \Phi(f_{ij}) \Phi(f_{ij})^T \qquad (20)$$

where $\mu_i^\Phi$ is the mean of class i in $R^F$, and $l_i$ is the number of samples belonging to class i. From the theory of reproducing kernels, any solution $w^\Phi \in R^F$ must lie in the span of all training samples in $R^F$, i.e., $$w^\Phi = \sum_{p=1}^{c} \sum_{q=1}^{l_p} \alpha_{pq} \Phi(f_{pq}) \qquad (21)$$

It follows that the solution for (21) is obtained by solving:

$$\lambda KK\alpha = KZK\alpha \qquad (22)$$

Consequently, equation (14) can be written as:

$$w_{OPT}^\Phi = \arg\max_{w^\Phi} \frac{|(w^\Phi)^T S_B^\Phi w^\Phi|}{|(w^\Phi)^T S_W^\Phi w^\Phi|} \qquad (23)$$

$$= \arg\max_{w^\Phi} \frac{|\alpha KZK\alpha|}{|\alpha KK\alpha|}$$

$$= [w_1^\Phi, \ldots, w_m^\Phi]$$

, where "arg max$_{w^\Phi}$" in equation (23) finds $w^\Phi$ that maximizes the ratio that follows arg max. The extracted eigenvector $w^\Phi = [w_1^\Phi, \ldots, w_m^\Phi]$ obtained in Equation (23) is called the Kernel Fisherface.

The vectors $\Phi(f)$ in the high dimensional feature space $R^F$ can now be projected to a lower dimensional space spanned by using the Kernel Fisherface (eigenvector) $w^\Phi$. The lower dimensional space has a dimension lower than both the dimension of the input space and the high dimensional feature space. The projection of $\Phi(f)$ onto the eigenvectors $w^\Phi$ becomes the nonlinear Fisher Linear Discriminant (FLD) corresponding to $\Phi(f)$:

$$w^\Phi \cdot \Phi(f) = \sum_{p=1}^{c} \sum_{q=1}^{l_p} \alpha_{pq} (\Phi(f_{pq}) \cdot \Phi(f)) = \sum_{p=1}^{c} \sum_{q=1}^{l_p} \alpha_{pq} k(f_{pq}, f) \qquad (24)$$

In this manner, it is possible to extract the Fisher Linear Discriminants using the kernel function without actually carrying out the burdensome computation that results from projecting the samples to a high dimensional feature space $R^F$. The low dimensional feature vector y for each for each feature vector is $w^\Phi \cdot \Phi(f)$ obtained in equation (24).

Figure 4:
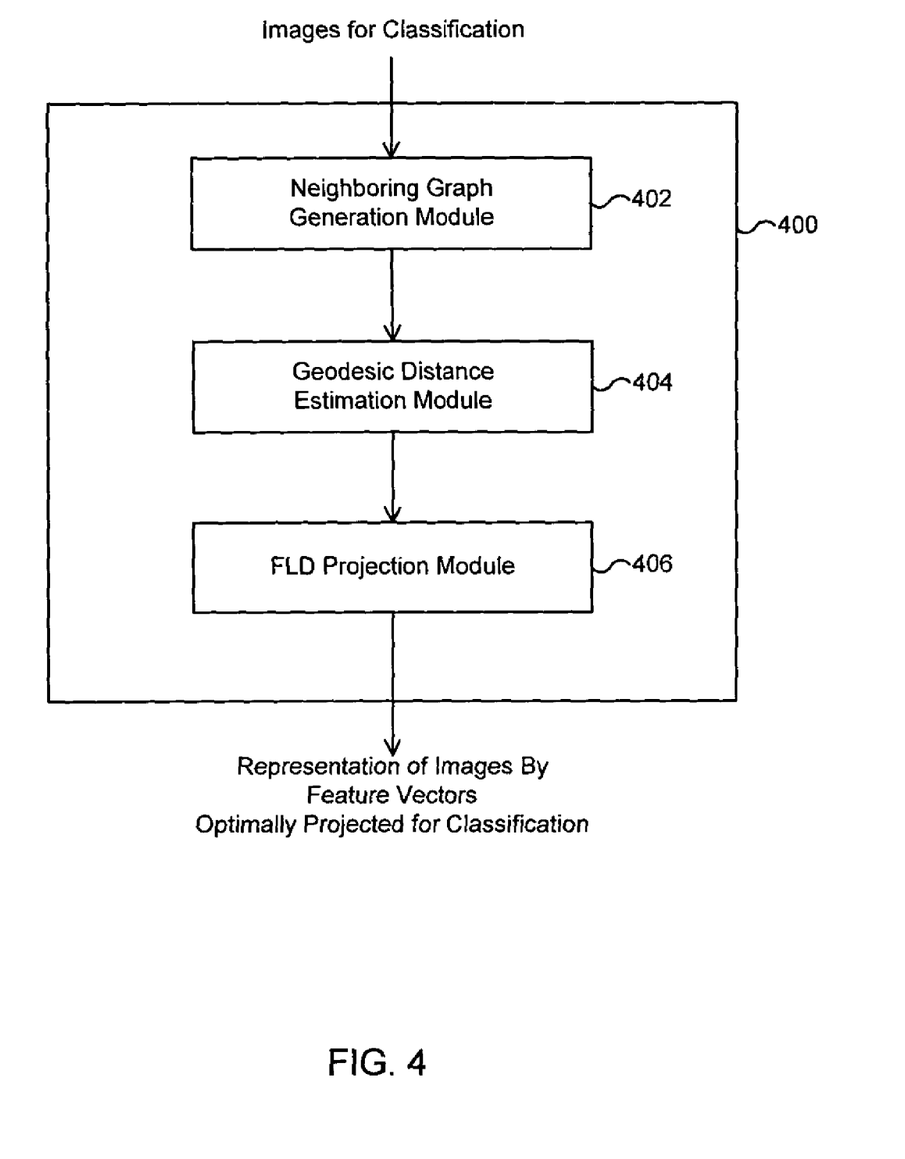
FIG. 4 is a diagram illustrating a system for representing images for pattern classification by extended Isomap according to a first embodiment of the present invention.

FIG. 4 is a diagram illustrating a system 400 for representing images for pattern classification by extended Isomap according to a first embodiment of the present invention. The system 400 includes a neighboring graph generation module 402, a geodesic distance estimation module 404, and a FLD projection module 406. The neighboring graph generation module 402 receives sample images of classification and generates a neighboring graph of the data points corresponding to the sample images according to step 204 of FIG. 2. The geodesic distance estimation module 404 estimates the geodesic distance between data points on the neighboring graph according to step 206 of FIG. 2. The FLD projection module 406 represents each data point by a feature vector corresponding to its geodesic distance to other data points on the neighboring graph and applies FLD to the feature vectors according to step 208 of FIG. 2, to output feature vectors representing the sample images that are optimally projected for classification.

Figure 5:
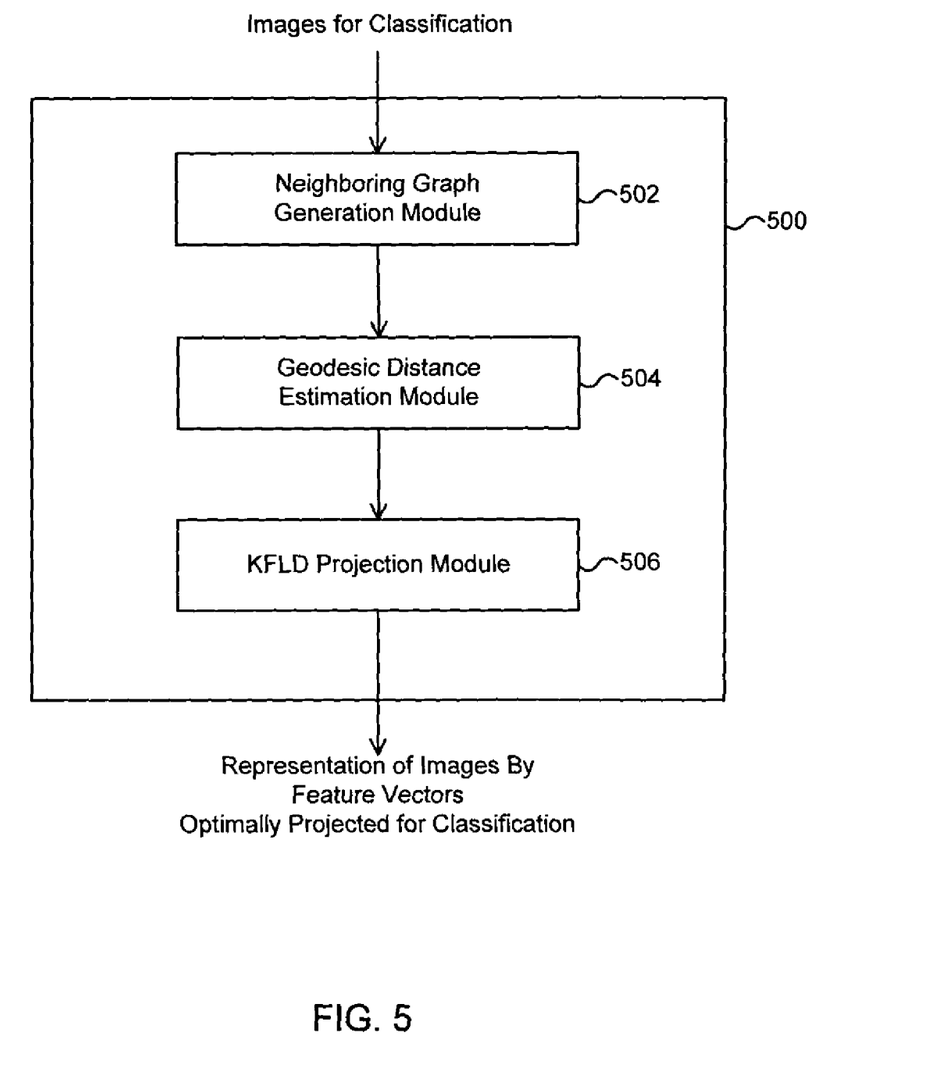
FIG. 5 is a diagram illustrating a system for representing images for pattern classification by extended Isomap according to a second embodiment of the present invention.

FIG. 5 is a diagram illustrating a system 500 for representing images for pattern classification by extended Isomap according to a second embodiment of the present invention. The system 500 includes a neighboring graph generation module 502, a geodesic distance estimation module 504, and a FLD projection module 506. The neighboring graph generation module 502 receives sample images of classification and generates a neighboring graph of the data points corresponding to the sample images according to step 304 of FIG. 3. The geodesic distance estimation module 504 estimates the geodesic distance between data points on the neighboring graph according to step 306 of FIG. 3. The FLD projection module 506 represents each data point by a feature vector corresponding to its geodesic distance to other data points on the neighboring graph and applies KFLD to the feature vectors according to step 308 of FIG. 3 to output feature vectors representing the sample images that are optimally projected for classification.

Two pattern classification problems, face recognition and handwritten digit recognition, were considered in order to test the performance of the extended Isomap method of the present invention in comparison with the conventional Isomap methods. These two problems have interesting characteristics and are approached differently. In the appearance-based methods for face recognition in frontal pose, each face image provides a rich description of one's identity and as a whole (i.e., holistic) is usually treated as a pattern without extracting features explicitly. Instead, subspace methods such as PCA (Principal Component Analysis) and FLD (Fisher Linear Discriminant) are applied to implicitly extract meaningful (e.g., PCA) or discriminant (e.g., FLD) features and then project patterns to a lower dimensional subspace for recognition. On the contrary, sophisticated feature extraction techniques are usually applied to handwritten digit images before any decision surface is induced for classification.

The extended Isomap of the present invention was tested against the conventional Isomap methods, LLE, Eigenface (PCA), and Fisherface (FLD) methods using a first set of test face images, a second set of test face images, and a third set of test handwritten digit images retrieved from publicly available databases. The first and second sets of test face images had several unique characteristics. While the images in the first set of test face images contained facial contours and vary in pose as well as scale, the face images in the second set of test face images had been cropped and aligned to include internal facial structures such as the eyebrow, eyes, nose, mouth and chin but do not contain facial contours. The face images in the first set of test face images were taken under well-controlled lighting conditions whereas the images in the second set of test face images were acquired under varying lighting conditions. For handwritten digit recognition problem, the extended Isomap method of the present invention was tested using the third set of test images of handwritten digits.

Figure 6:
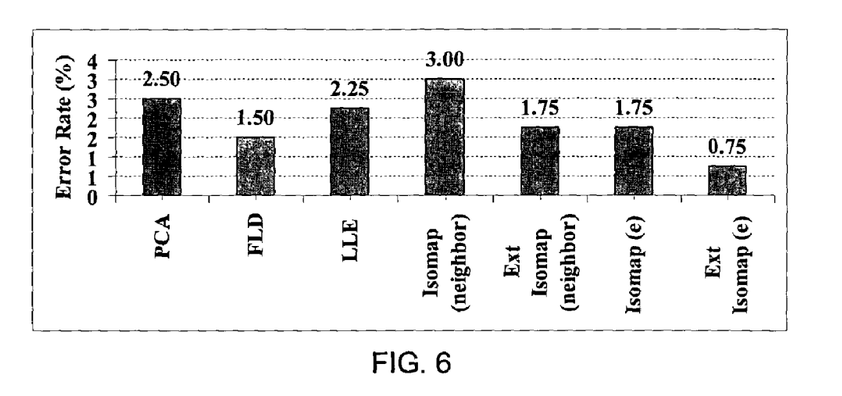
FIG. 6 is a graph illustrating the results of testing the method of representing images for pattern classification by extended Isomap according to the first embodiment of the present invention on a first set of test face images.

FIG. 6 is a graph illustrating the results of testing the method of representing images for pattern classification by extended Isomap according to the first embodiment of the present invention (using FLD with conventional Isomap) on the first set of test face images. The first set of test face images contained 400 images of 40 subjects. To reduce computational complexity, each face image was down-sampled to 23×28 pixels for experiments. Each face image was represented by a raster scan vector of the intensity values, and then the intensity values were normalized to be zero-mean unit-variance vectors.

The tests were performed using the "leave-one-out" strategy (i.e., m-fold cross-validation). To classify an image of a person, that image was removed from the training set of (m−1) images and the projection matrix was computed. All the m images in the training set were projected to a reduced space and recognition is performed based on a nearest neighbor classifier. The parameters, such as the number of principal components in the Eigenface (PCA) and the LLE methods, were empirically determined to achieve the lowest error rate by each method. For the Fisherface method (FLD) and the extended Isomap method of the present invention, all samples were projected onto a subspace spanned by the c−1 largest eigenvectors (where c is the number of classes).

Referring to FIG. 6, among all the face recognition methods, the extended Isomap method with the radius implementation (labeled "Ext Isomap (e)") is shown as achieving the lowest error rate and outperforming the Fisherface method (labeled "FLD") by a significant margin and the other methods (e.g., PCA, LLD). The two implementations of the extended Isomap (one with k-nearest neighbor (extended k-Isomap, labeled "Ext Isomap (neighbor)") and the other with ϵ radius (extended ϵ-Isomap, labeled "Ext Isomap (e)") for determining neighboring data points) consistently perform better than their counterpart conventional Isomap methods (k-Isomap labeled "Isomap (neighbor)" and ϵ-Isomap labeled "Isomap (e)", respectively) with lower error rates in pattern classification by a significant margin.

Figure 7:
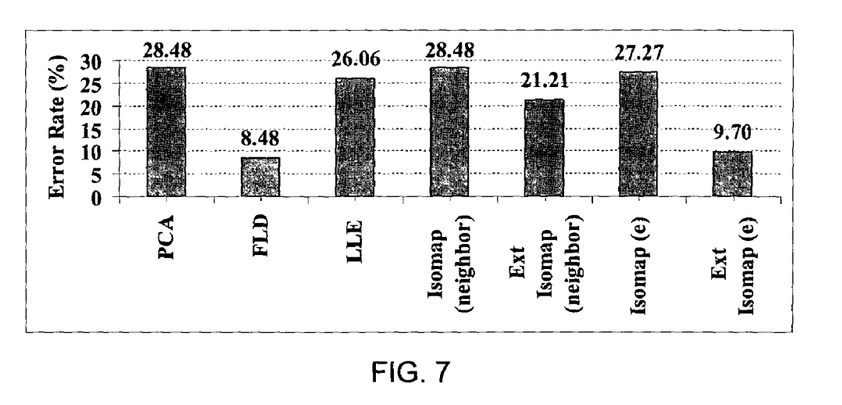
FIG. 7 is a graph illustrating the results of testing the method of representing images for pattern classification by extended Isomap according to the first embodiment of the present invention on a second set of test face images.

FIG. 7 is a graph illustrating the results of testing the method of representing images for pattern classification by extended Isomap according to the first embodiment of the present invention (using FLD with conventional Isomap) on the second set of test face images. The second set of test face images contained 165 images of 11 subjects that include variation of facial expression and lighting. For computational efficiency, each face image was down-sampled to 29×41 pixels. Similarly, each face image was represented by a centered vector of normalized intensity values.

The tests were performed using the leave-one-out strategy, and the number of principal components were varied to achieve the lowest error rates for Eigenface (PCA) and LLE methods. For the Fisherface method (FLD) and the extended Isomap method of the present invention, the samples were projected onto a subspace spanned by the c−1 largest eigenvectors (where c is the number of classes).

Referring to FIG. 7, both implementations of the extended Isomap method (one with k-nearest neighbor (extended k-Isomap, labeled "Ext Isomap (neighbor)") and the other with ϵ radius (extended ϵ-Isomap, labeled "Ext Isomap (e)") for determining neighboring data points) perform better than their counterpart conventional Isomap methods (Isomap (neighbor) and Isomap (e), respectively) with lower error rates in pattern classification. Furthermore, the extended ϵ-Isomap method (Ext Isomap (e)) performs almost as well as the Fisherface method (FLD, which is one of the best methods in the face recognition) while the conventional Isomap does not perform well on the second set of test face images.

Figure 8A:
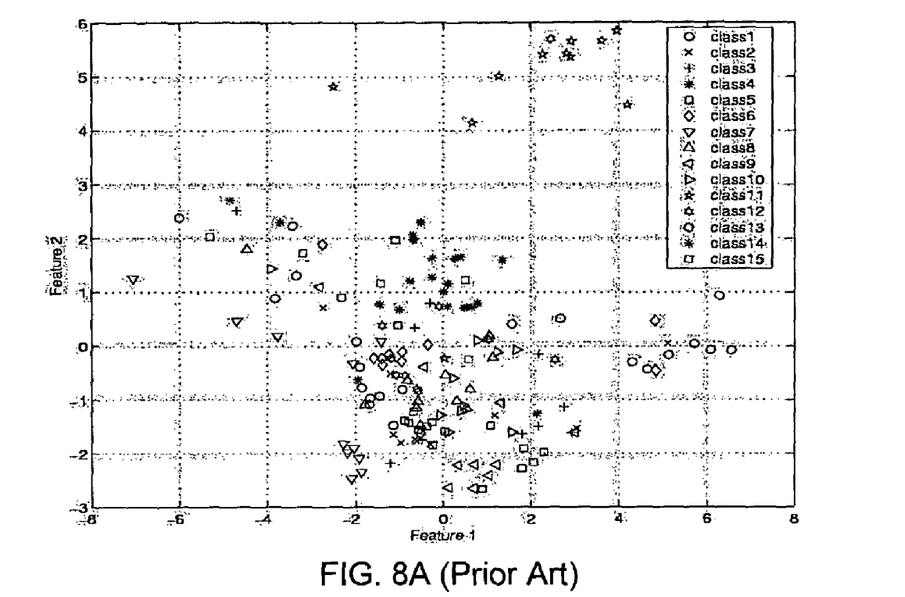
FIG. 8A is a graph illustrating sample images projected by the conventional Isomap method.
Figure 8B:
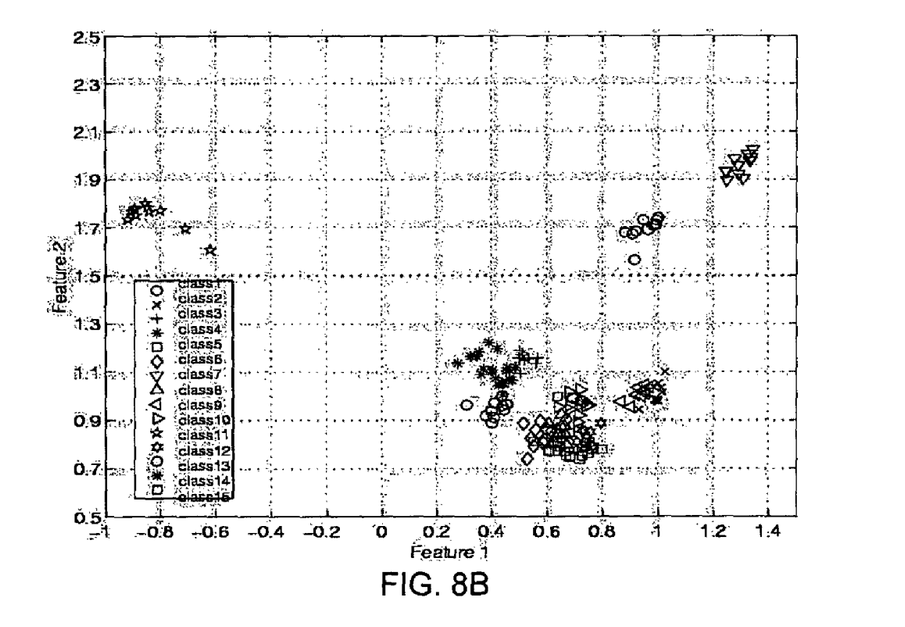
FIG. 8B is a graph illustrating sample images projected by the extended Isomap method according to the first embodiment of the present invention.

FIG. 8A is a graph illustrating sample images in the second set of test face images projected by the conventional Isomap method, and FIG. 8B is a graph illustrating sample images in the second set of test face images projected by the extended Isomap method according to the first embodiment of the present invention. In FIG. 8A, the test samples of the second set of test face images were projected onto the first two eigenvectors extracted by the conventional Isomap method, and in FIG. 8B, the test samples of the second set of test face images were projected onto the first two eigenvectors extracted by the extended Isomap method of the present invention as described in FIG. 2. The projected samples of different classes are smeared in the conventional Isomap method as shown in FIG. 8A, whereas the samples projected by the extended Isomap method of the present invention are separated well as shown in FIG. 8B.

Figure 9:
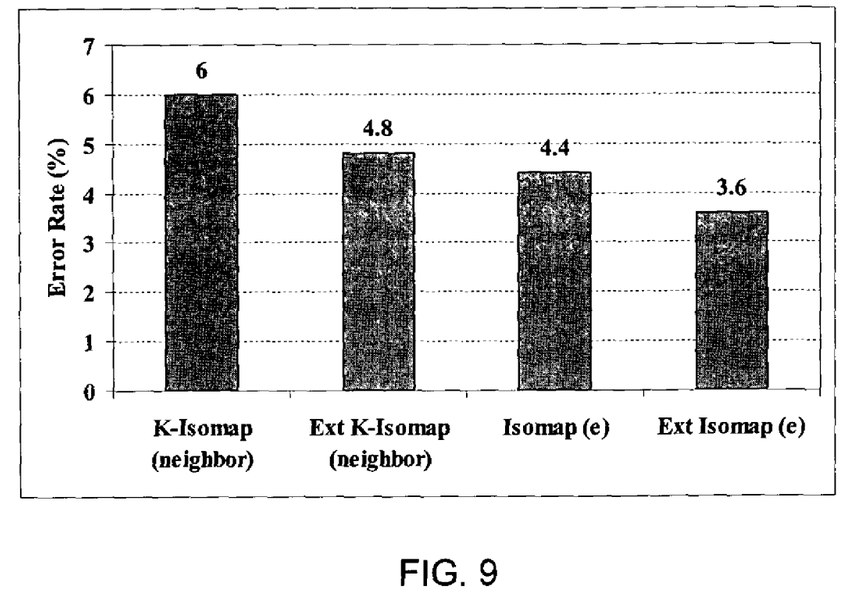
FIG. 9 is a graph illustrating the results of testing the method of representing images for pattern classification by extended Isomap according to the first embodiment of the present invention on a third set of test face images.

FIG. 9 is a graph illustrating the results of testing the method of representing images for pattern classification by extended Isomap according to the first embodiment of the present invention on the third set of test handwritten digit images. The third set of test handwritten digit images contained a training set of 60,000 examples and a test set of 10,000 examples. The images were normalized while preserving their aspect ratio, and each one was centered in a 28×28 window of gray scales by computing the center of mass of the pixels and translating the image so as to position the center of mass at the center.

Due to computational and memory constraints, a training set of 1,500 handwritten digit images was randomly selected from the third set of test handwritten digit images and a non-overlapping test set of 250 images was randomly selected for experiments from the third set of test handwritten digit images. The same experiment was carried out five times and the test parameters were varied to achieve the lowest error rates in each run. Each image was represented by a raster scan vector of intensity values without applying any feature extraction algorithms.

Referring to FIG. 9, the averaged results of conventional k-Isomap (labeled "K-Isomap (neighbor)"), the extended k-Isomap (labeled "Ext K-Isomap (neighbor)"), conventional ϵ-Isomap (labeled "Isomap (e)"), and the extended ϵ-Isomap (labeled "Ext Isomap (e)") methods are shown. As shown in FIG. 9, the extended Isomap methods consistently outperform their counterpart conventional Isomap methods with lower error rates in pattern recognition in the experiments with the third set of test handwritten digit images.

Although the present invention has been illustrated as a method and system, it should be noted that the method of the present invention can be embodied in a computer program product recorded on any type of computer readable medium. It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A method of representing a set of images for pattern classification, the method comprising:
    receiving data points corresponding to the set of images in an input space;
    generating a neighboring graph indicating whether the data points are neighbors;

estimating pairwise geodesic distances between a first data point and a plurality of other data points based upon the neighboring graph;

representing the first data point by a first feature vector comprising the estimated pairwise geodesic distances between the first data point and the plurality of other data points; and applying Fisher Linear Discriminant to a set of feature vectors including the first featured vector comprising the pairwise geodesic distances between the first data and the plurality of other data points to obtain an optimal direction for projecting the feature vectors for pattern classification.

2. The method of claim 1, wherein generating a neighboring graph comprises:

determining distances between the data points;

determining whether the data points are neighbors based on the determined distances;

responsive to determining that the data points are neighbors, representing the data points in the neighboring graph using the determined distance; and responsive to determining that the data points are not neighbors, representing the data points in the neighboring graph using a predetermined value, wherein the predetermined value indicates that the data points are not neighbors.

3. The method of claim 2, wherein determining whether the data points are neighbors comprises selecting a predetermined number of closest data points from each data point based on the determined distance as the neighbors.

4. The method of claim 2, determining whether the data points are neighbors comprises selecting data points within a predetermined radius from each data point based on the determined distance as the neighbors.

5. The method of claim 1, wherein estimating the geodesic distance between the data points comprises approximating the geodesic distance between the data points with a distance covered by a sequence of hops between neighboring data points on the neighboring graph.

6. The method of claim 5, wherein approximating the geodesic distance between the data points comprises applying a Floyd-Warshall algorithm.

7. The method of claim 1, wherein applying Fisher Linear Discriminant to the feature vectors comprises projecting the feature vectors to a lower dimensional space lower in dimension than the input space so as to substantially maximize a variance between clusters of feature vectors while substantially minimizing the variance within each cluster of the feature vectors.

8. The method of claim 7, wherein the variance between the clusters of the feature vectors is represented by a between-class scatter matrix and the variance within each cluster of the feature vectors is represented by a within-class scatter matrix.

9. The method of claim 8, wherein the feature vectors are projected to the lower dimensional space so as to substantially maximize a ratio of the between-class scatter matrix to the within-class scatter matrix.

10. The method of claim 1, wherein the images are face images or digit images.

11. A method of representing a set of images for pattern classification, the method comprising:

receiving data points corresponding to the set of images in an input space;

generating a neighboring graph indicating whether the data points are neighbors;

estimating pairwise geodesic distances between a first data point and a plurality of other data points based upon the neighboring graph;

representing the first data point by a first feature vector comprising the estimated pairwise geodesic distances between the first data point and the plurality of other data points; and applying Kernel Fisher Linear Discriminant to a set of feature vectors including the first featured vector comprising the pairwise geodesic distances between the first data and the plurality of other data points to obtain an optimal direction for projecting the feature vectors for pattern classification.

12. The method of claim 11, wherein generating a neighboring graph comprises:

determining distances between the data points;

determining whether the data points are neighbors based on the determined distances;

responsive to determining that the data points are neighbors, representing the data points in the neighboring graph using the determined distance; and responsive to determining that the data points are not neighbors, representing the data points in the neighboring graph using a predetermined value, wherein the predetermined value indicates that the data points are not neighbors.

13. The method of claim 12, wherein determining whether the data points are neighbors comprises selecting a predetermined number of closest data points from each data point based on the determined distance as the neighbors.

14. The method of claim 12, wherein determining whether the data points are neighbors comprises selecting data points within a predetermined radius from each data point based on the determined distance as the neighbors.

15. The method of claim 11, wherein estimating the geodesic distance between the data points comprises approximating the geodesic distance between the data points with a distance covered by a sequence of hops between neighboring data points on the neighboring graph.

16. The method of claim 15, wherein approximating the geodesic distance between the data points comprises applying a Floyd-Warshall algorithm.

17. The method of claim 11, wherein applying Kernel Fisher Linear Discriminant to the feature vectors comprises:

projecting the feature vectors to a high dimensional feature space using a projection function;

generating Kernel Fisherfaces for the feature vectors projected to the high dimensional feature space;

projecting the feature vectors to a lower dimensional space lower in dimension than the input space and the high dimensional feature space based on the Kernel Fisherfaces so as to substantially maximize a variance between clusters of feature vectors while substantially minimizing the variance within each cluster of the feature vectors.

18. The method of claim 17, wherein the variance between the clusters of the feature vectors is represented by a between-class scatter matrix and the variance within each cluster of the feature vectors is represented by a within-class scatter matrix.

19. The method of claim 18, wherein the feature vectors are projected to the lower dimensional space so as to substantially maximize a ratio of the between-class scatter matrix to the within-class scatter matrix.

20. The method of claim 19, wherein a fraction of an identity matrix is added to the within-class scatter matrix.

21. The method of claim 17, wherein the projection function satisfies the following relation:

$$k(x,y)=\Phi(x)\cdot\Phi(y)$$

where k(x,y) is a kernel function, is the dot product of the projection functions and, and x and y are real number variables.

22. The method of claim 11, wherein the images are face images or digit images.

23. A system for representing a set of images for pattern classification, the system comprising:

neighboring graph generation module for receiving data points corresponding to the set of images in an input space and for generating a neighboring graph indicating whether the data points are neighbors;

a geodesic distance estimation module for estimating pairwise geodesic distances between a first data point and a plurality of other data points based upon the neighboring graph; and a Fisher Linear Discriminant module for representing the first data point by a first feature vector comprising the estimated pairwise geodesic distances between the first data point and the plurality of other data points and for applying Fisher Linear Discriminant to a set of feature vectors including the first featured vector comprising the pairwise geodesic distances between the first data and the plurality of other data points to obtain an optimal direction for projecting the feature vectors for pattern classification.

24. The system of claim 23, wherein the neighboring graph generation module generates the neighboring graph by:

determining distances between the data points;

determining whether the data points are neighbors based on the determined distances;

responsive to determining that the data points are neighbors, representing the data points in the neighboring graph using the determined distance; and responsive to determining that the data points are not neighbors, representing the data points in the neighboring graph using a predetermined value, wherein the predetermined value indicates that the data points are not neighbors.

25. The system of claim 24, wherein determining whether the data points are neighbors comprises selecting a predetermined number of closest data points from each data point based on the determined distance as the neighbors.

26. The system of claim 24, wherein determining whether the data points are neighbors comprises selecting data points within a predetermined radius from each data point based on the determined distance as the neighbors.

27. The system of claim 23, wherein the geodesic distance estimation module estimates the geodesic distance between the data points by approximating the geodesic distance between the data points with a distance covered by a sequence of hops between neighboring data points on the neighboring graph.

28. The system of claim 23, wherein the Fisher Linear Discriminant module applies Fisher Linear Discriminant to the feature vectors by projecting the feature vectors to a lower dimensional space lower in dimension than the input space so as to substantially maximize a variance between clusters of feature vectors while substantially minimizing the variance within each cluster of the feature vectors.

29. The system of claim 28, wherein the variance between the clusters of the feature vectors is represented by a between-class scatter matrix and the variance within each cluster of the feature vectors is represented by a within-class scatter matrix.

30. The system of claim 29, wherein the feature vectors are projected to the lower dimensional space so as to substantially maximize a ratio of the between-class scatter matrix to the within-class scatter matrix.

31. The system of claim 23, wherein the images are face images or digit images.

32. A system for representing a set of images for pattern classification, the system comprising:

neighboring graph generation module for receiving data points corresponding to the set of images in an input space and for generating a neighboring graph indicating whether the data points are neighbors;

a geodesic distance estimation module for estimating pairwise geodesic distances between a first data point and a plurality of other data points based upon the neighboring graph; and a Kernel Fisher Linear Discriminant module for representing the first data point by a first feature vector comprising the estimated pairwise geodesic distances between the first data point and the plurality of other data points and for applying Kernel Fisher Linear Discriminant to a set of feature vectors including the first featured vector comprising the pairwise geodesic distances between the first data and the plurality of other data points to obtain an optimal direction for projecting the feature vectors for pattern classification.

33. The system of claim 32, wherein the neighboring graph generation module generates the neighboring graph by:

determining distances between the data points;

determining whether the data points are neighbors based on the determined distances;

responsive to determining that the data points are neighbors, representing the data points in the neighboring graph using the determined distance; and responsive to determining that the data points are not neighbors, representing the data points in the neighboring graph using a predetermined value, wherein the predetermined value indicates that the data points are not neighbors.

34. The system of claim 33, wherein determining whether the data points are neighbors comprises selecting a predetermined number of closest data points from each data point based on the determined distance as the neighbors.

35. The system of claim 33, wherein determining whether the data points are neighbors comprises selecting data points within a predetermined radius from each data point based on the determined distance as the neighbors.

36. The system of claim 32, wherein the geodesic distance estimation module estimates the geodesic distance between the data points by approximating the geodesic distance between the data points with a distance covered by a sequence of hops between neighboring data points on the neighboring graph.

37. The system of claim 32, wherein the Kernel Fisher Linear Discriminant module applies Kernel Fisher Linear Discriminant to the feature vectors by:

projecting the feature vectors to a high dimensional feature space using a projection function;

generating Kernel Fisherfaces or the feature vectors projected to the high dimensional feature space; and projecting the feature vectors to a lower dimensional space lower in dimension than the input space and the high dimensional feature space based on the Kernel Fisherfaces so as to substantially maximize a variance between clusters of feature vectors while substantially minimizing the variance within each cluster of the feature vectors.

38. The system of claim 37, wherein the variance between the clusters of the feature vectors is represented by a between-class scatter matrix and the variance within each cluster of the feature vectors is represented by a within-class scatter matrix.

39. The system of claim 38, wherein the feature vectors are projected to the lower dimensional space so as to substantially maximize a ratio of the between-class scatter matrix to the within-class scatter matrix.

40. The system of claim 37, wherein the projection function satisfies the following relation:

$$k(x,y)=\Phi(x)\cdot\Phi(y)$$

where k(x,y) is a kernel function, is the dot product of the projection functions and, and x and y are real number variables.

41. The system of claim 32, wherein the images are face images or digit images.

42. A computer program product for representing a set of images for pattern classification, the computer program product stored on a computer readable medium and adapted to perform a method comprising:
receiving data points corresponding to the set of images in an input space;
generating a neighboring graph indicating whether the data points are neighbors;
estimating pairwise geodesic distances between a first data point and a plurality of other data points based upon the neighboring graph;
representing the first data point by a first feature vector comprising the estimated pairwise geodesic distances between the first data point and the plurality of other data points; and
applying Fisher Linear Discriminant to a set of feature vectors including the first featured vector comprising the pairwise geodesic distances between the first data and the plurality of other data points to obtain an optimal direction for projecting the feature vectors for pattern classification.

43. A computer program product for representing a set of images for pattern classification, the computer program product stored on a computer readable medium and adapted to perform a method comprising:
receiving data points corresponding to the set of images in an input space;
generating a neighboring graph indicating whether the data points are neighbors;
estimating pairwise geodesic distances between a first data point and a plurality of other data points based upon the neighboring graph;
representing the first data point by a first feature vector comprising the estimated pairwise geodesic distances between the first data point and the plurality of other data points; and
applying Kernel Fisher Linear Discriminant to a set of feature vectors including the first featured vector comprising the pairwise geodesic distances between the first data and the plurality of other data points to obtain an optimal direction for projecting the feature vectors for pattern classification.

44. A system for representing a set of images for pattern classification, the system comprising:
means for receiving data points corresponding to the set of images in an input space and for generating a neighboring graph indicating whether the data points are neighbors;
means for estimating pairwise geodesic distances between a first data point and the plurality of other data points based upon the neighboring graph; and
means for representing the first data point by a first feature vector comprising the estimated pairwise geodesic distances between the first data point and the plurality of other data points and for applying Fisher Linear Discriminant to a set of feature vectors including the first featured vector comprising the pairwise geodesic distances between the first data and the plurality of other data points to obtain an optimal direction for projecting the feature vectors for pattern classification.

45. A system for representing a set of images for pattern classification, the system comprising:
means for receiving data points corresponding to the set of images in an input space and for generating a neighboring graph indicating whether the data points are neighbors;
means for estimating pairwise geodesic distances between a first data point and a plurality of other data points based upon the neighboring graph; and
means for representing the first data point by a first feature vector comprising the estimated pairwise geodesic distances between the first data point and the plurality of other data points and for applying Kernel Fisher Linear Discriminant to a set of feature vectors including the first featured vector comprising the pairwise geodesic distances between the first data and the plurality of other data points to obtain an optimal direction for projecting the feature vectors for pattern classification.

* * * * *